(12) United States Patent
Christen

(10) Patent No.: US 7,334,385 B2
(45) Date of Patent: *Feb. 26, 2008

(54) AUTOMATED TUCKING PROCESS FOR COVERING A PENETRABLE CORE MATERIAL

(75) Inventor: Dennis Christen, Columbus, TX (US)

(73) Assignee: DiversiTech Corporation, Duluth, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/134,240

(22) Filed: May 20, 2005

(65) Prior Publication Data

US 2005/0268575 A1 Dec. 8, 2005

Related U.S. Application Data

(63) Continuation of application No. 10/835,246, filed on Apr. 29, 2004, now Pat. No. 6,931,822, which is a continuation-in-part of application No. 10/234,630, filed on Sep. 4, 2002, now Pat. No. 6,927,183.

(51) Int. Cl.
*B65B 11/00* (2006.01)
*B65B 13/00* (2006.01)

(52) U.S. Cl. .............................. 53/464; 53/466; 53/222; 53/580

(58) Field of Classification Search .................. 53/464, 53/466, 222, 580; 264/295, 257, 258, 255, 264/320, 263; 156/216, 196
See application file for complete search history.

(56) References Cited

U.S. PATENT DOCUMENTS

| | | | |
|---|---|---|---|
| 1,358,508 A | | 11/1920 | Birdsey |
| 1,526,307 A | * | 2/1925 | Birdsey ...................... 428/120 |
| 1,576,142 A | * | 3/1926 | Schumacher ................ 428/125 |
| 1,595,899 A | * | 8/1926 | McDonough .............. 428/66.7 |
| 1,678,959 A | * | 7/1928 | Schumacher ................ 428/125 |
| 1,787,163 A | | 12/1930 | Adolph |
| 2,046,867 A | | 7/1936 | Billner |
| 2,265,636 A | | 12/1941 | Eaton |
| 2,394,219 A | * | 2/1946 | Vachon ........................... 69/8 |
| 2,621,142 A | * | 12/1952 | Wetherell ..................... 428/74 |
| 2,625,636 A | * | 1/1953 | Gauci et al. ................ 219/153 |
| 3,285,364 A | | 11/1966 | Cohen |
| 3,367,818 A | | 2/1968 | Voelker |
| 4,186,536 A | | 2/1980 | Piazza |
| 4,229,497 A | * | 10/1980 | Piazza .......................... 428/71 |
| 4,362,679 A | | 12/1982 | Malinowski |
| 4,450,022 A | | 5/1984 | Galer |
| 4,495,235 A | | 1/1985 | Tesch |
| 4,504,335 A | | 3/1985 | Galer |
| 4,505,082 A | | 3/1985 | Schmitz |
| 4,505,449 A | | 3/1985 | Turner et al. |
| 4,559,263 A | | 12/1985 | Roodvoets |

(Continued)

OTHER PUBLICATIONS

Moslemi, A.A., "Emerging Technologies in Mineral-Bonded Wood and Fiber Composites"; College of Forestry, University of Idaho, Moscow, ID, 2000 Kluwer Academic Publishers.

*Primary Examiner*—Rinaldi I. Rada
*Assistant Examiner*—John Paradiso
(74) *Attorney, Agent, or Firm*—Smith Gambrell & Russell LLP

(57) ABSTRACT

A process for covering a rigid, penetrable core article with covering material and automatically tucking the material into a surface of the article with an automatically reciprocating plunger.

18 Claims, 19 Drawing Sheets

U.S. PATENT DOCUMENTS

| | | |
|---|---|---|
| 4,774,794 A | 10/1988 | Grieb |
| 4,946,725 A | 8/1990 | Harlan |
| 5,033,525 A * | 7/1991 | Paeselt ............... 160/39 |
| 5,209,968 A | 5/1993 | Sweeney |
| 5,333,830 A | 8/1994 | Millen |
| 5,350,554 A | 9/1994 | Miller |
| 5,389,166 A | 2/1995 | White |
| 5,460,672 A | 10/1995 | Mallonee |
| 5,476,701 A * | 12/1995 | Berger ............... 428/81 |
| 5,505,245 A * | 4/1996 | Badalamenti ........ 160/38 |
| 5,601,896 A | 2/1997 | Bodine et al. |
| 5,728,458 A | 3/1998 | Sweeney |
| 6,001,496 A | 12/1999 | O'Haver-Smith |
| 6,017,407 A | 1/2000 | Yates |
| 6,047,421 A * | 4/2000 | Barone ............... 5/655.9 |
| 6,096,166 A | 8/2000 | Liou |
| 6,395,384 B1 | 5/2002 | Adam |
| 6,488,792 B2 | 12/2002 | Mathieu |
| 6,777,063 B2 | 8/2004 | Born |
| 6,878,321 B2 | 4/2005 | Hauber et al. |
| 6,892,507 B1 | 5/2005 | Pease |
| 6,927,183 B1 | 8/2005 | Christen |
| 6,931,822 B1 | 8/2005 | Christen |
| 7,232,589 B2 | 6/2007 | Christen |

* cited by examiner

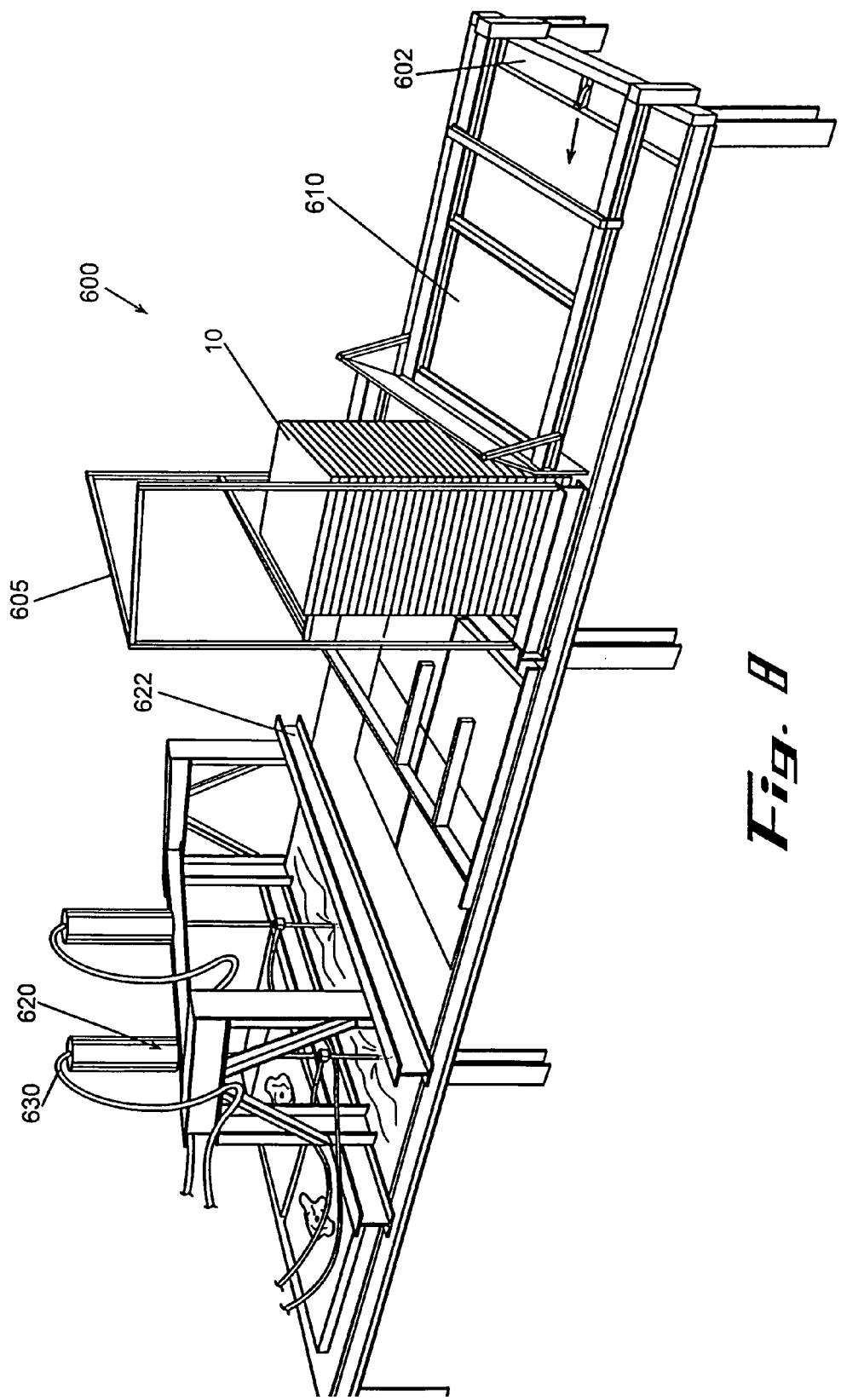

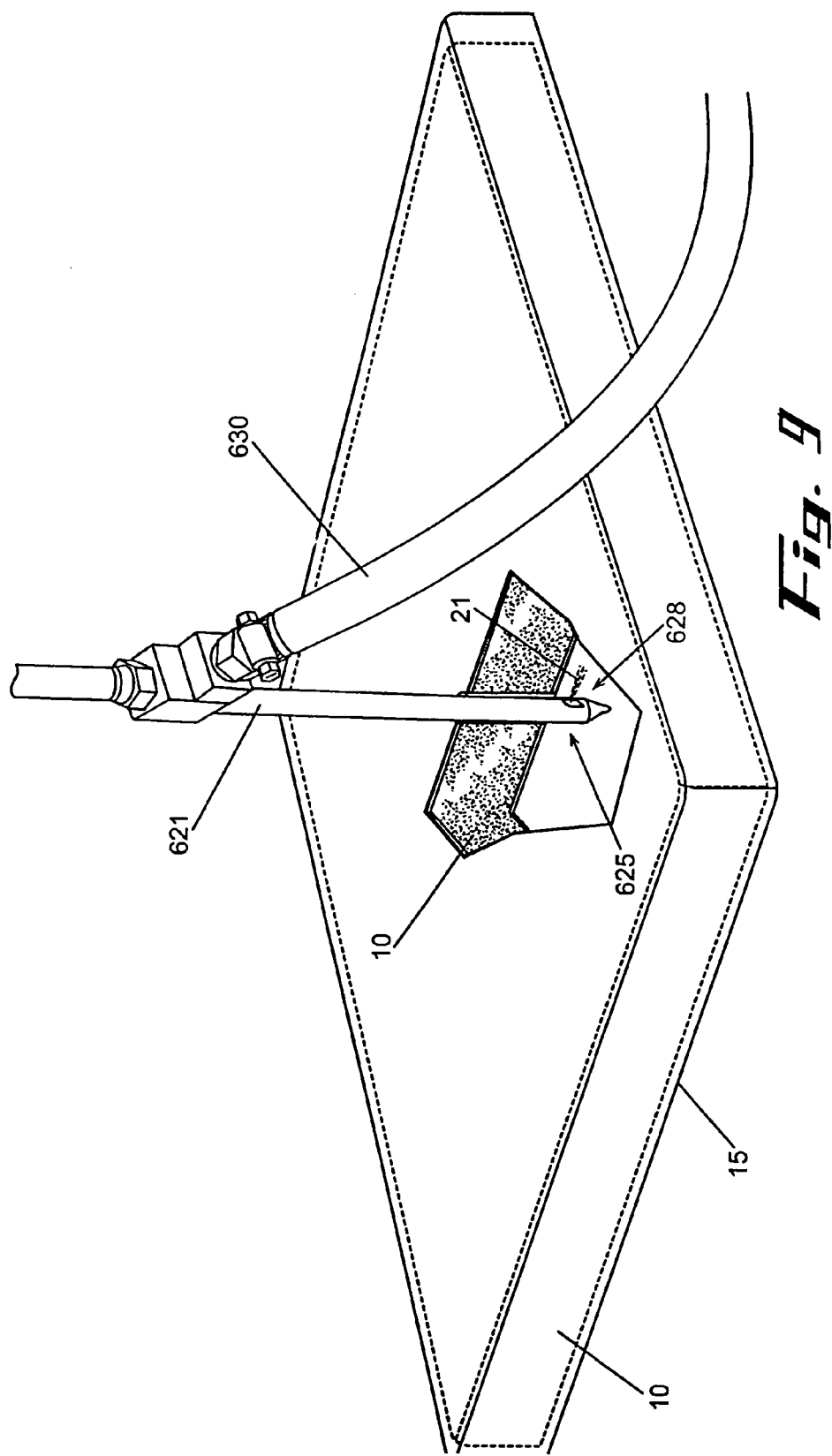

AUTOMATED TUCKING PROCESS FOR COVERING A PENETRABLE CORE MATERIAL

CROSS-REFERENCE TO RELATED APPLICATIONS

This application is a continuation of U.S. patent application Ser. No. 10/835,246, filed Apr. 29, 2004, now U.S. Pat. No. 6,931,822 which is a continuation-in-part of U.S. patent application Ser. No. 10/234,630, filed Sep. 4, 2002, now U.S. Pat. No. 6,927,183 both of which are relied on and incorporated herein by reference.

BACKGROUND

The present invention relates generally to systems and methods for manufacturing covered articles.

Examples of reinforced materials are well-known in the art, including U.S. Pat. No. 5,728,458 to Sweeney entitled "Light-Weight High-Strength Composite Pad" and U.S. Pat. No. 5,209,968 to Sweeney entitled "Composite Structure With Waste Plastic Core And Method of Making Same," both of which are incorporated herein by reference. These examples disclose the use of core materials coated with reinforcing layers for multi-use pads, equipment pads, building panels, and other applications.

Typically, these prior art reinforced layered structures are formed by manual covering processes such as wrapping a core, trimming excess wrapping material, and attaching the material to or into the article with adhesive, physical bindings, or direct insertion into the article core. These manual steps can require a number of individuals, limit the quantity of articles that can be manufactured in a given time frame, and result in inconsistent products. Accordingly there is a need to automate the covering of articles.

The present invention answers this need by providing a covering apparatus and method that automates the covering process for manufacturing articles.

SUMMARY OF THE INVENTION

The present invention provides an apparatus and method for covering articles. In embodiments of the invention, covering, trimming, and/or tucking of material into a core material is automated.

In an embodiment of the invention a conveyor system is provided for transporting an article to covering, trimming and/or tucking stations to cover the article.

In an embodiment of the invention a fibrous fabric is tucked into a core material comprising expanded polystyrene (EPS) foam, moldable into any desired shape. In further embodiments, additional material layers may be applied or injected on and/or beneath the covering material to achieve desired reinforcing characteristics.

The present invention further provides a system and method for manufacturing reinforced articles with a core material covered with a covering material by injecting a desired compound or mixture between the core material and covering material to create an inner reinforcing layer.

In another embodiment of the invention, an automated covering station is provided wherein covering material is dispensed for surrounding an article core. In one embodiment, the core material is covered by the dispensed material as the core drops through a slot in a covering table across which the covering material is dispensed.

In a further embodiment of the present invention, an automated tucking station is provided on a conveyor system for tucking one or more portions of the covering material into the core material. In some embodiments, the tucking apparatus includes parallel pairs of horizontal and vertical tucking apparatuses for plunging covering material into the core.

In another embodiment of the present invention, a corner trimming station with an automated pincher and welder is provided for trimming excess fabric at the corners of the covered core material by pulling and welding the excess corner fabric.

BRIEF DESCRIPTION OF THE DRAWINGS

FIG. 7 is a top perspective view of a four corner automated weld trimming apparatus in an embodiment of the present invention.

FIG. 8 is a top perspective view of a reinforcing layer injection station in an embodiment of the present invention.

FIG. 9 is a perspective partial cut-away view of a covered core material being injected with an inner reinforcing layer mixture in an embodiment of the present invention.

DETAILED DESCRIPTION OF THE INVENTION

The present invention provides a reinforced article and system and method for making the same. Those of ordinary skill in the art will appreciate that an embodiment described herein including an expanded polystyrene (EPS) foam core material with a fabric covering material and cement mixture reinforcing layer is by way of example only, and a variety of alternative materials could be used. In this regard, exemplary covering materials may include fabric, fibrous wrap, webs, mesh, glass mats, paper, and any other types of synthetic or natural fibrous material that is pregnable by a desired reinforcing layer. Core materials include foamable materials such as polyurethane, polyisocyanurate, EPS, other rigid foams, plastics, corks, wood, synthetic polymers, and similar rigid core materials. Those of ordinary skill in the art will further appreciate that such core materials may be molded into virtually any shape or size as may be desired for the reinforced article. The reinforced mixture layer may include mixtures of concrete, plaster, epoxy, synthetic resins, polymers, paint, waterproofing compounds, glues, foams, and similar mixtures or materials capable of injection between a core material and covering material. In this regard, "injection" may include the deposit of the reinforcing material by injection entirely through a core material at any desired angle, or, alternatively, with an appropriate injection head, through the covering material, so as to deposit the reinforcing layer between the covering material and core material.

Figure 1:
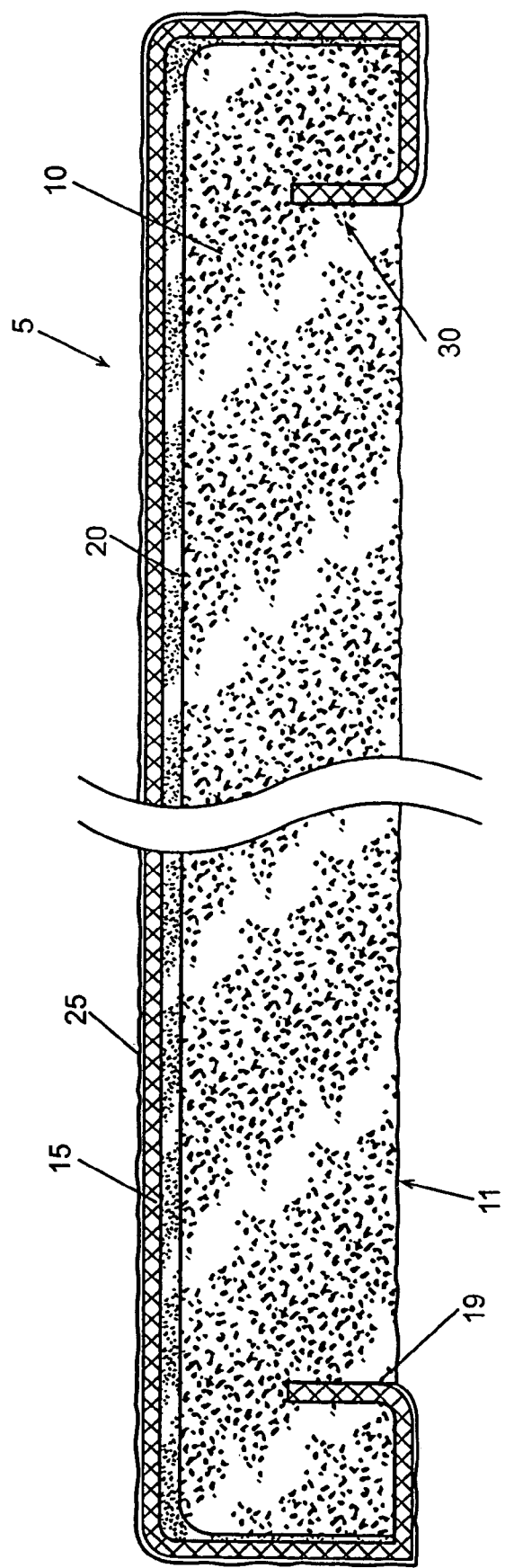
FIG. 1 is a cross-sectional view of a reinforced article in an embodiment of the present invention.

Referring to FIG. 1, a cross section of reinforced article 5 is shown. A core material 10 is surrounded by covering material 15. In an embodiment of the invention, covering material 15 includes fabric woven or non-woven. An inner reinforcing mixture layer 20, including a cement mixture in one embodiment, is provided between the core material 10 and the covering material 15.

Covering material edges 19 are tucked into tucking grooves 30 in the core material 10. The tucked edges 19 keep the covering material 15 tightly surrounding the core material. Further, the tucked edges 19 and tucking groove 30 maximize retention of inner reinforcing mixture layer 20 between core material 10 and covering material 15.

In alternative embodiments, tucking of edges 19 may be replaced or augmented by gluing or other adhesives, taping, stapling, sewing, heat binding, and like methods for adhering edges 19 to the core material 10.

In an embodiment of the invention, the inner reinforcing mixture layer 20 is injected between the core material 10 and covering material 15 after the covering material 15 is secure with tucked edges 19 in tucking groove 30. As described subsequently, a needle head with a dispersion hole may be used for depositing the inner reinforcing mixture layer 20.

In an embodiment of the invention, the inner reinforcing mixture layer 20 is injected as a slurry mixture, such as a cement mixture, concrete mixture, plaster mixture, epoxy mixture, synthetic resin mixture, polymer mixture, paint mixture, or waterproofing mixture and the like, depending on the desired end use of the reinforced article. Such mixtures are preferably metered to deposit such amounts as are necessary to create a desired thickness and characteristics of the reinforcing layer 20 and reinforced article 5. Accordingly, depending on the properties of the mixture deposited for the inner reinforcing mixture layer 20, such mixture is cured to provide the desired reinforcing characteristics of the mixture used.

In alternative embodiments of the invention, one or more outer reinforcing mixture layers 25 may be provided in reinforced article 5. Outer layer 25 may be the same or a different substance from inner layer 20. In an embodiment of the present invention where the reinforced article 5 is an equipment pad, both the inner layer 20 and outer layer 25 are cured cement mixtures. However, optional outer layer 25 may comprise one or multiple layers that include any materials with desired characteristics for reinforced article 5. In embodiments of the present invention, the outer reinforcing mixture layer 25 includes concrete, plaster, epoxy, synthetic resins, polymers, paint, waterproofing compounds, cement, glues, and the like. It will be understood that this is only an exemplary list, and further appreciated that the curing of any applied mixtures, such as slurry mixtures, may be desirable to achieve desired characteristics of the outer reinforcing mixture layer 25.

Figure 10:
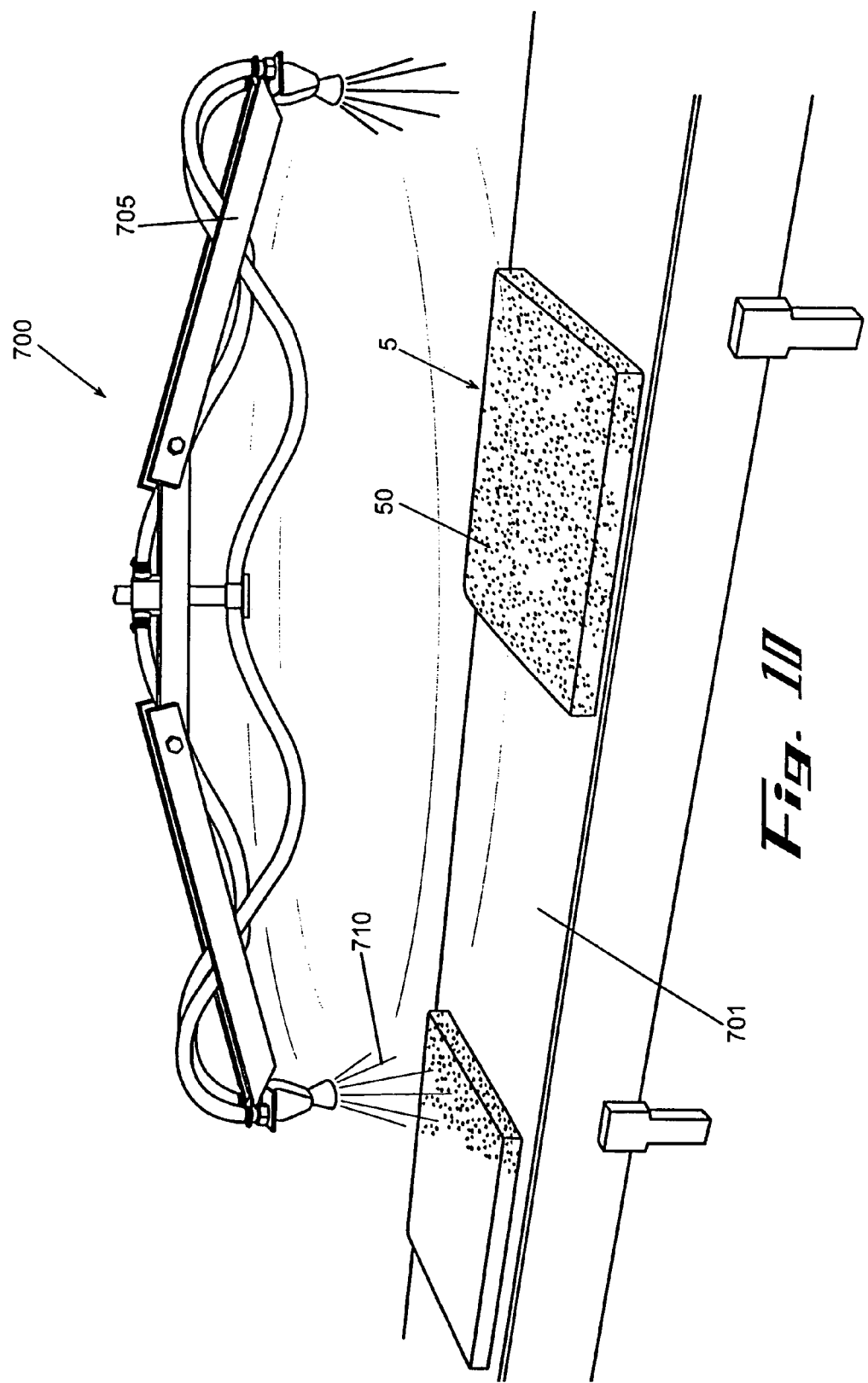
FIG. 10 is a texturizing station in an embodiment of the present invention.

In another embodiment of the present invention, an outer reinforcing layer 25 includes a texture layer 50 (FIG. 10). In one embodiment of the present invention, the texture layer 50 includes a solid substance, such as sand 710 (FIG. 10), but may include virtually any solid with desired texture and binding characteristics with outer layer 25.

In embodiments of the present invention where covering material 15 is a fabric or other fibrous material, inner layer 20 and optional outer layers 25 and texture layer 50, at least in part, impregnate the covering material 15 to bind and create the desirable reinforced surface layers surrounding core material 10 of reinforced article 5.

Figure 2:
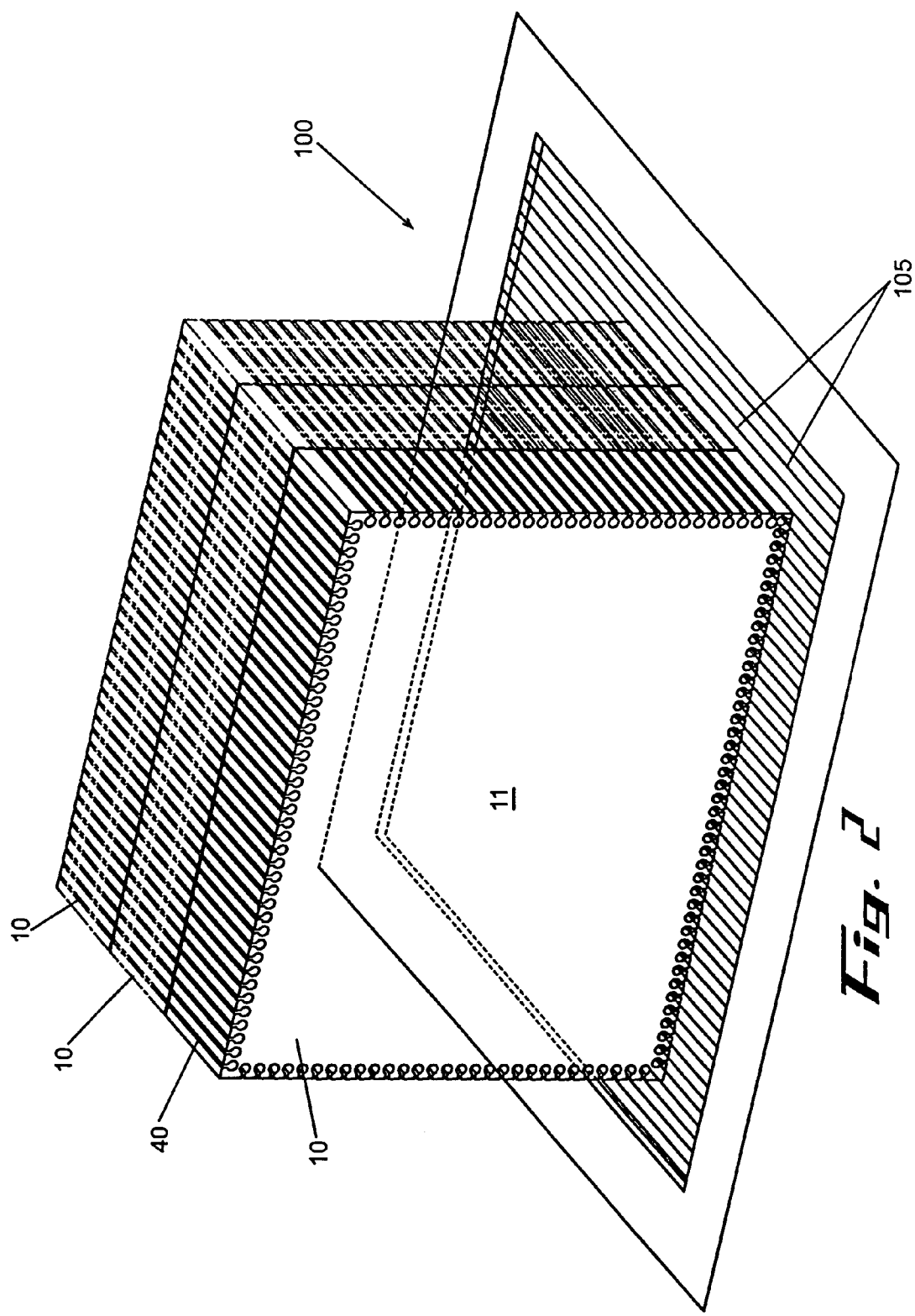
FIG. 2 is a perspective view of a bottom surface of a core material in a stack of core materials with receiving channels being burned at a receiving channel burning station in an embodiment of the present invention.

Referring to FIG. 2, in an embodiment of the present invention, core material 10 includes inner reinforcing layer receiving channels 40. Where core material 10 is EPS foam, the receiving channels 40 are burned at a receiving channel burning station 100.

The receiving channel burning station includes hot wire burners 105 on which the core material 10 is placed to burn the receiving channel 40.

The receiving channels 40 are burned on any surface of the core material which will contact the inner reinforcing mixture layer 20 and be surrounded by covering material 15. For instance, the receiving channels may be burned along all surfaces of the core material 10, or along side surfaces 15, or top surfaces and side surfaces, or any combinations thereof.

The receiving channels 40 permit greater deposition of the inner reinforcing mixture layer 20 than a mere flat surface. Accordingly, the depths of the receiving channels 40 may be increased or decreased for the desired purpose of the reinforced article 5 and reinforcing characteristics of the inner layer 20.

As shown in FIG. 2, the core material may be stacked as a plurality of core materials to burn receiving channels on multiple core materials' 10 surfaces at once. The stack is rotated to each desired receiving channel burning surface for burning on hot wires 105. In this embodiment, it will be appreciated that front and back surfaces may be burned with receiving channels 40 by separating each individual core material 10 from the stack to burn the desired surface.

Further, depending on the properties and material of the core material 10, receiving channels 40 may be formed by alternative methods such as cutting, drilling and boring.

In an embodiment of the present invention for manufacturing a reinforced pad, the receiving channels 40 are preferably burned into a top surface (not shown) and side surfaces of a core material 10 made of EPS foam.

Referring again to FIG. 1, with continuing reference to FIG. 2, the inner reinforcing mixture layer 20 of cement mixture forms a layer on the top and side surfaces of the core material and between the covering material 15. In this embodiment, the covering material is preferably pregnable fibrous fabric and the tucked ends 19 sustain the inner reinforcing layer 20 around the top and side surface of the core material 10 to also promote deposition of the inner reinforcing mixture layer 20 into the receiving channels 40 of the top and side surfaces. In this embodiment, the receiving channels 40 are preferably ⅛" wide by ¼" deep.

Figure 3:
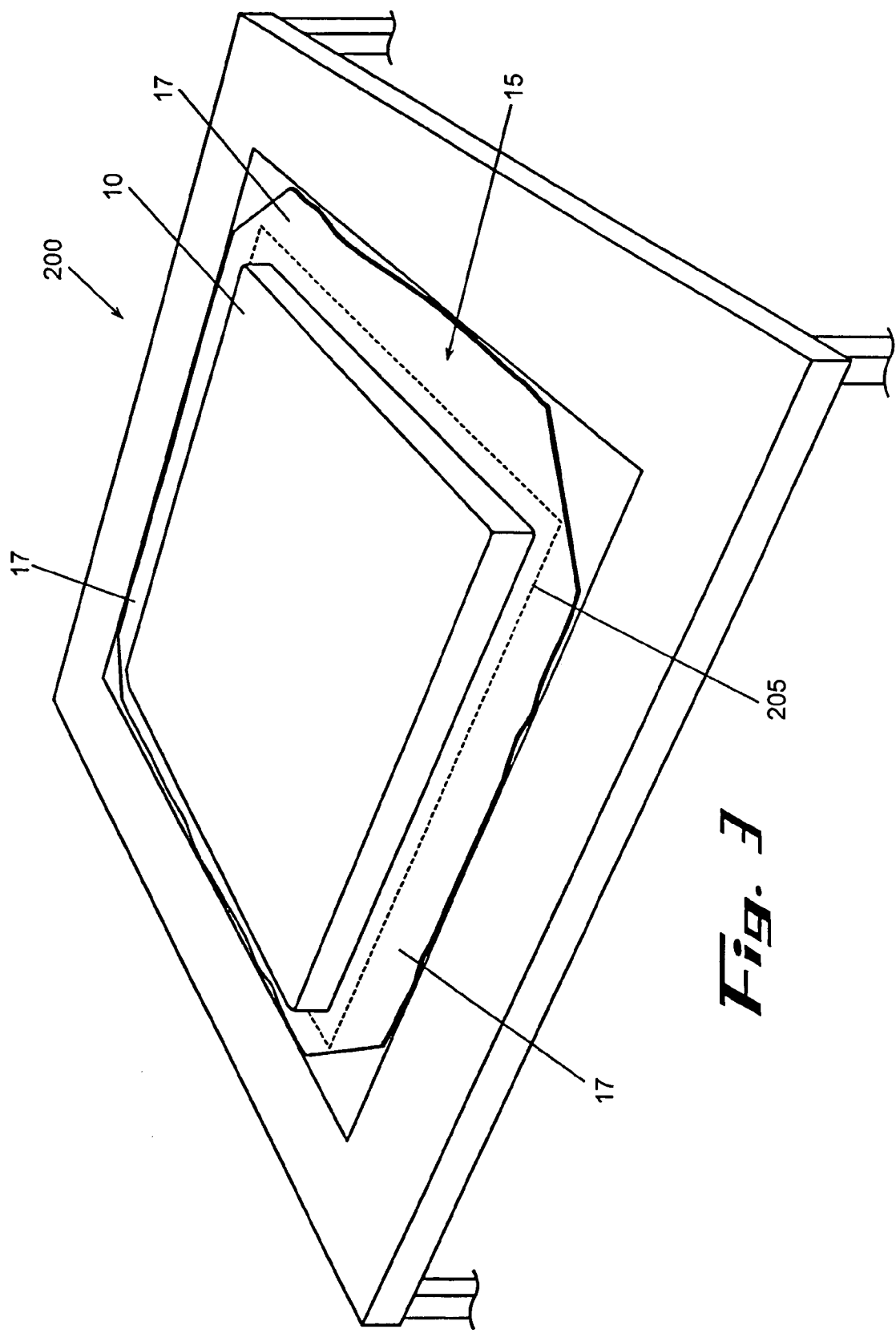
FIG. 3 is a top perspective view of a core material and covering material being positioned thereon at a covering material template table in an embodiment of the present invention.

Referring to FIG. 3, a covering material application station 200 is shown. In embodiments where optional receiving channels 40 are utilized, the core material 10 is covered with covering material 15 after forming the receiving channels 40. Alternatively, where receiving channels 40 are not desired, the covering material is applied prior to injection of inner reinforcing mixture layer 20.

In an embodiment of the present invention, the covering material application station provides proper alignment of fabric covering material 15. A fabric template 205 is sized to the shape of the core material 10 so that the core material is centered on the fabric covering material 15. The fabric application station 200 is preferably a light table wherein the fabric template includes a template periphery for aligning the fabric covering material 15.

Once the core material is centered on the fabric covering material 15, the flaps 17 of the fabric are folded over the core material 10.

Figure 4:
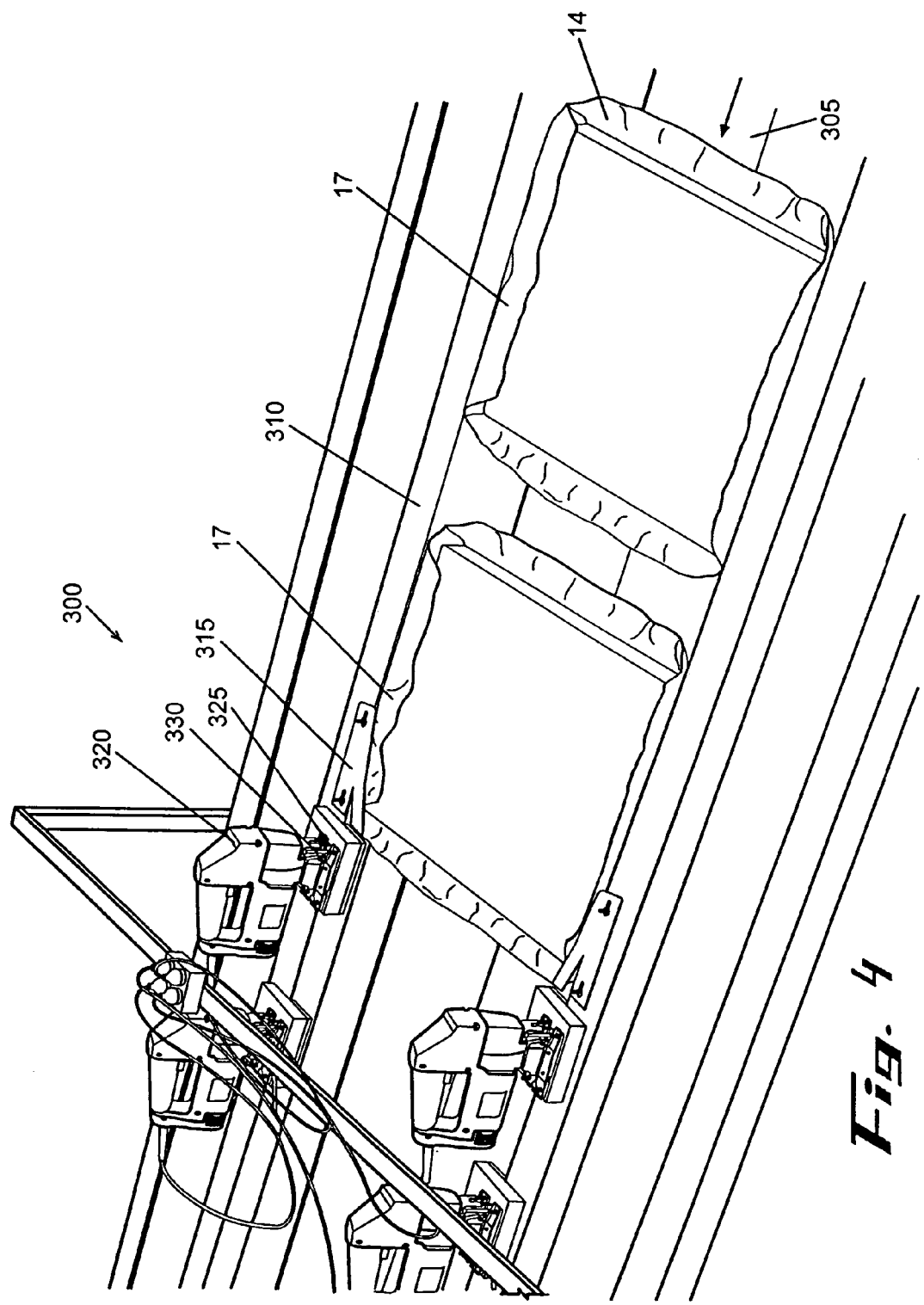
FIG. 4 is a top perspective view of a covering material tucking station in an embodiment of the present invention.

Referring to FIG. 4, the core material 10 including the folded flaps 17 of covering material 15 is placed in covering material tucking station 300.

The tucking station 300 includes a conveyor belt 305 for directing a plurality of covered core materials to a tucking apparatus 320. As shown in FIG. 4, two pairs of tucking apparatuses 320 are used in one embodiment of the invention to tuck flaps 17 into tucking grooves 30 (FIG. 1) as folded edges 19 (FIG. 1).

On opposite sides of the conveyor belt 305, flap rail guides 310 are provided for maintaining the folded flaps 17 in a desired position against core material 10. The rail guides 310 terminate at flap folder 315 as the covered core material 10 is directed at each opposite flap 17 to tucking apparatus 320.

Figure 5:
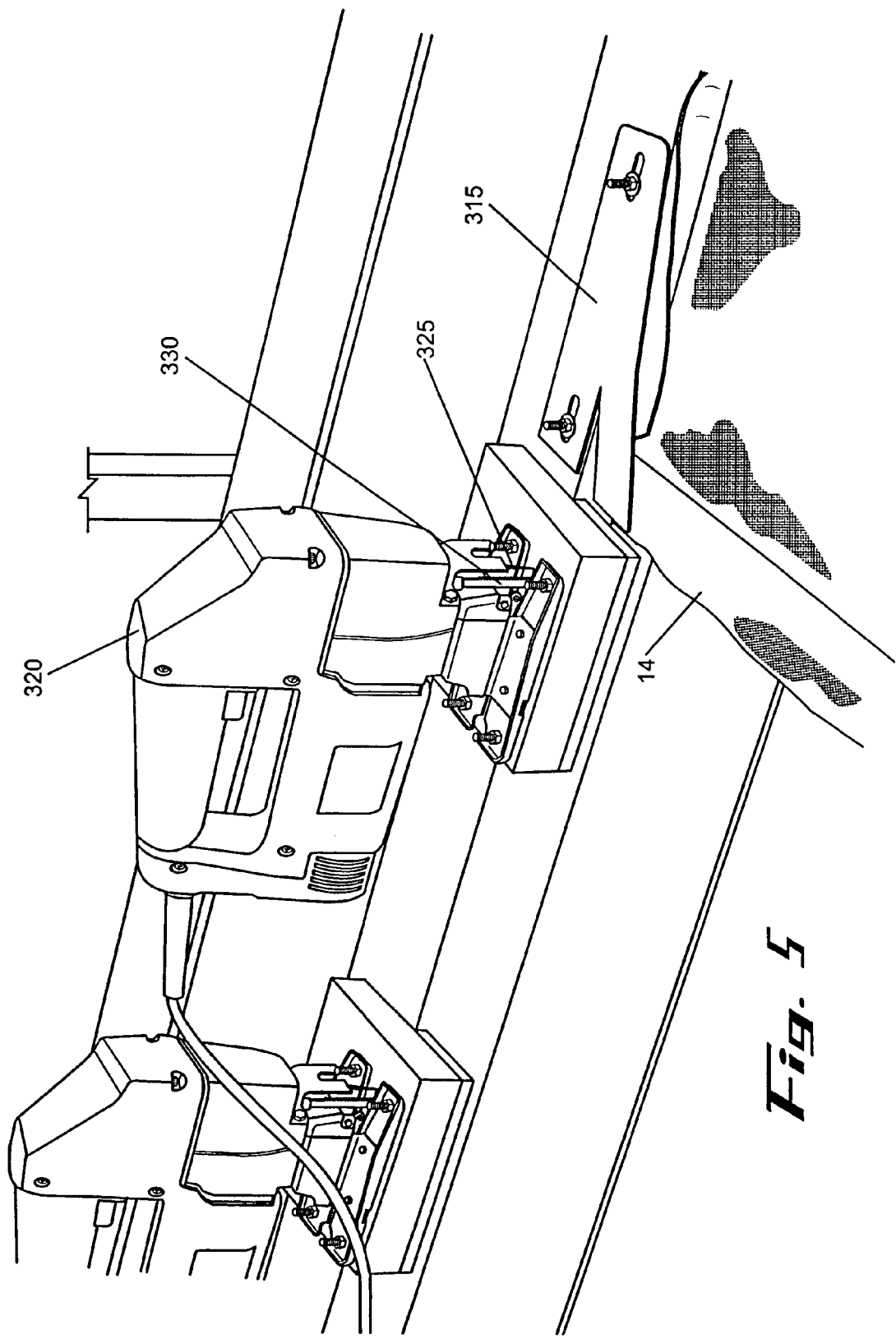
FIG. 5 is a perspective view of a tucking apparatus including an automated tucking needle and plunger in an embodiment of the present invention.

Referring to FIG. 5, and continuing reference to FIG. 4, tucking apparatus 320 includes a groove perforation needle 325 and tucking plunger 330. Each of the needle 325 and plunger 330 are automated so as to actuate a rapid up and down plunging movement.

After the flaps 17 are directed through the flap folder 315, the needle 325 perforates the flap 17 and core material 10 to create a tucking groove 30 (FIG. 1) perforation line. A blunt plunger head 330 follows the perforation needle 325 to tuck covering material edge 19 (FIG. 1) into tucking groove 30 (FIG. 1). In an embodiment of the invention, a plurality of tucking apparatuses 320 may be used to reinforce tucking of the covering material edge 19 into tucking groove 30. In other embodiments of the present invention, multiple tucking apparatuses are implemented to form multiple tucked grooves for additional tucking of portions of the covering material 15 into the core material 10.

In further embodiments of the invention, where the core material 10 is square or rectangular shaped, the covered core material 10 is rotated 90 degrees following initial tucking on opposite flaps 17. Unfolded opposite flaps 14 are folded and the covered core material similarly placed on conveyer 305 of the tucking station 300 to tuck flaps 14 with tucking apparatus 320. In such embodiment, the top and four side surfaces of the core material 10 are completely covered by covering material 15 and all four edges of the fabric covering material 15 are tucked into the bottom surface 11 of the core material 10.

Figure 6:
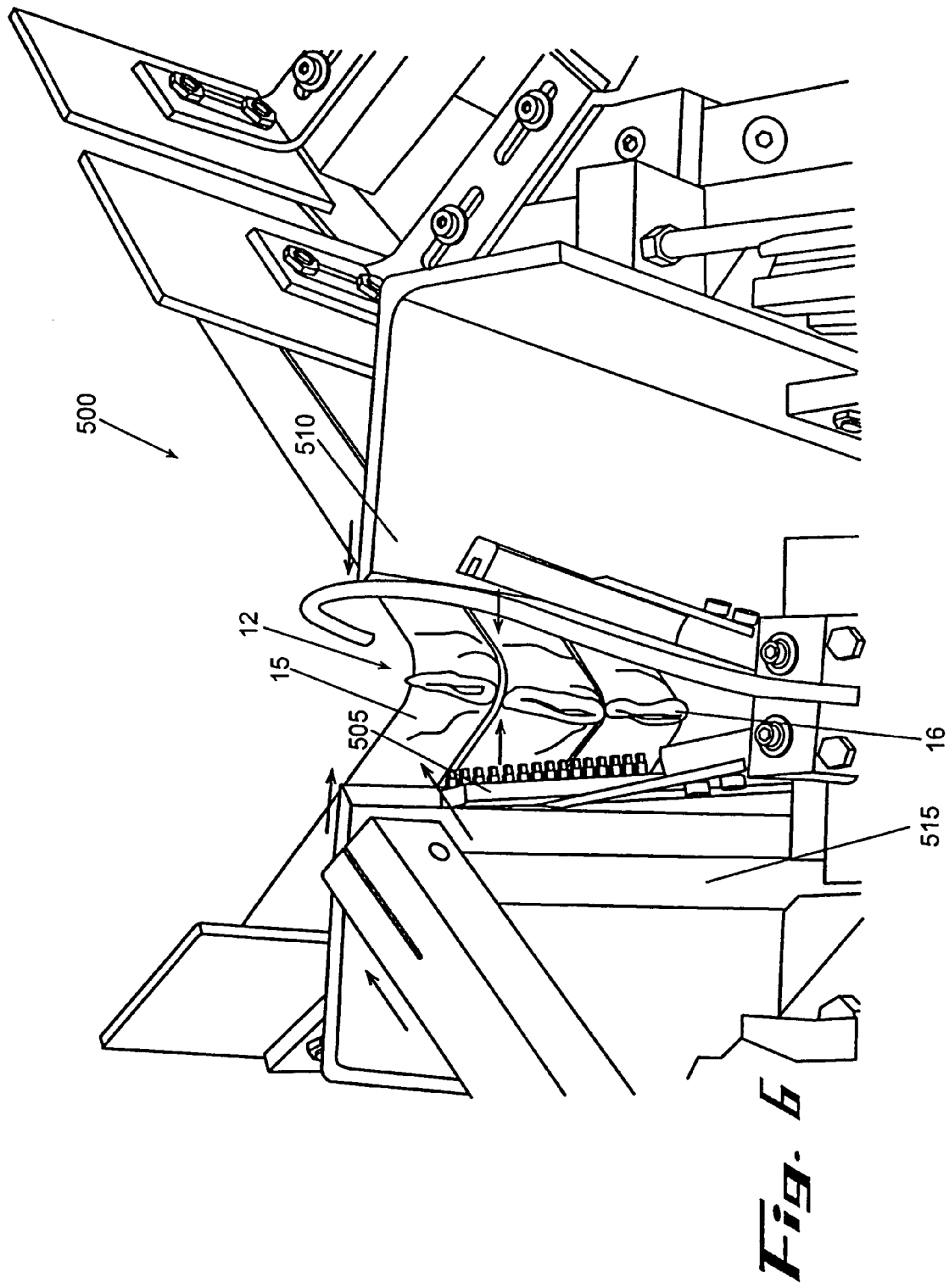
FIG. 6 is a perspective view of an excess fabric weld trimming station including pinchers, weld holders, and weld blade in an embodiment of the present invention.
Figure 1:
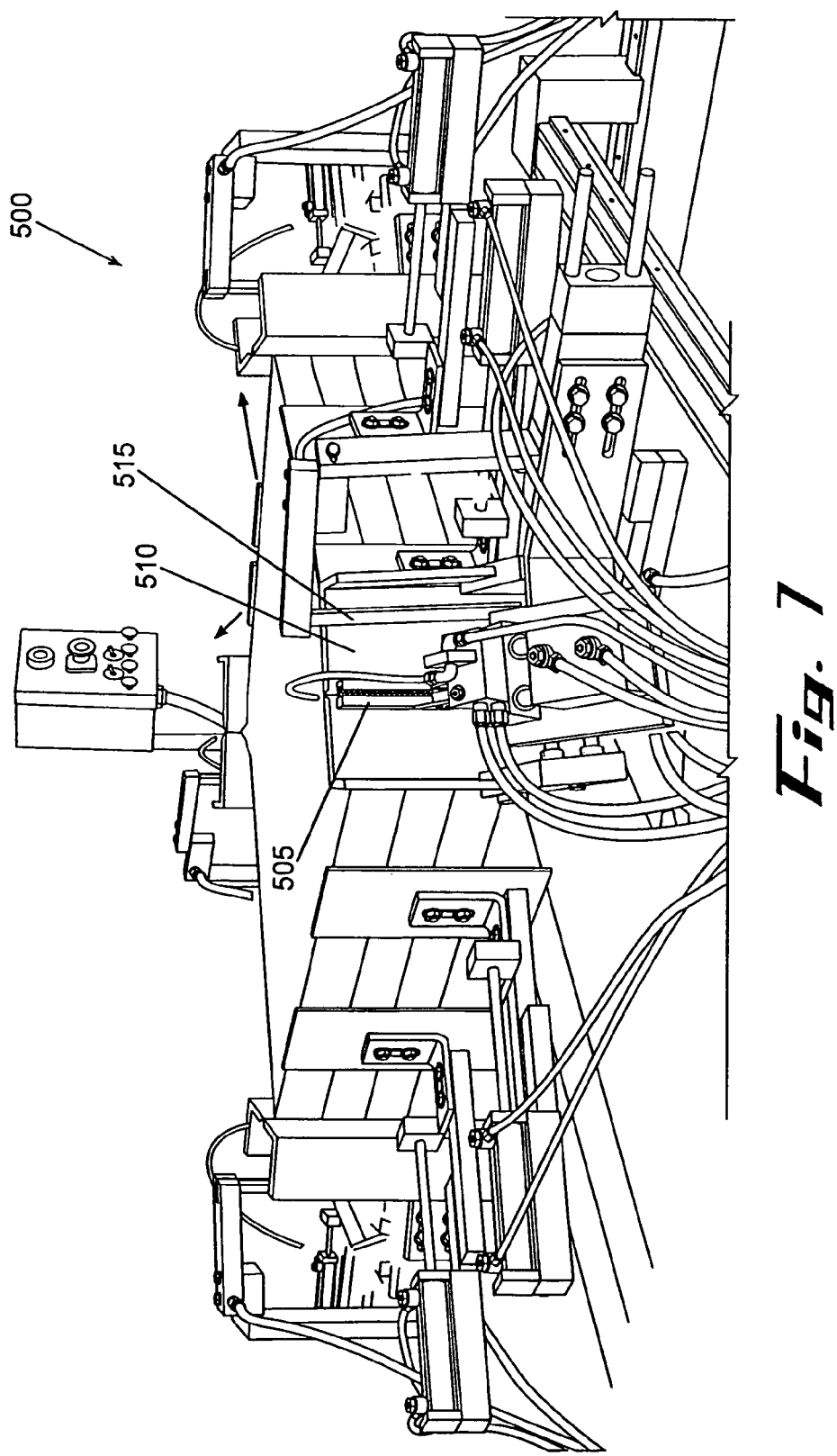

Referring to FIG. 6, in an embodiment of the invention with fabric covering material 15 covering a corner 12 of the core material 10, and adjacent sides of the covering material tucked into a surface of the core material 10, excess fabric corner 16 will result at corner 12.

In embodiments of the invention, it is desirable to trim the excess fabric corner 16 at a corner weld and trimming station 500. The corner trimming station 500 includes actuated pinchers 505 that pinch excess fabric corner 16 and subsequently pull the excess fabric corner 16 outward from the core material corner 12. Corner weld holders 510 actuate to pinch and hold the excess fabric corner 16 at a point near the core material corner 12. An automatic trim weld blade 515 is actuated toward the pinched excess fabric corner 16 and the weld blade 515 welds the excess fabric corner 16, such as a fibrous woven or non-woven fabric, to create a welded tight, trimmed edge while the excess fabric corner 16 is burned off and discarded. In some instances, additional trimming, such as by hand, of the fabric welded corner may be necessary to achieve a smooth welded corner edge.

Referring to FIG. 7, in an embodiment of the invention wherein the reinforced article 5 is square or rectangular shaped, the corner trimming station 500 includes four sets of pinchers 505, weld holders 510, and weld blades 515. In this embodiment, the covered core material 10 is placed so that each corner is positioned between each set of pinchers 505, weld holders 510, and weld blades 515, to allow automatic welding and trimming of all four corners at once.

In a further embodiment, a plurality of covered core materials may be stacked to permit trimming of a plurality of stacked corners 12 simultaneously.

Referring to FIG. 8, a reinforcing layer injection station 600 is depicted with an injector 620 connected to a mixture supply line 630.

In an embodiment of the present invention, the injection station 600 includes a conveyor 602 to provide automated injection of a plurality of covered core materials 10.

In a further embodiment of the present invention, square or rectangular covered core materials 10 are stacked at a stacking partition 605 that aligns the stacked covered core material 10 for positioning on the conveyor 602 to the injector 620.

An indexer 610 is actuated in the line of conveyor movement toward the bottom covered core material 10 in the stack. The indexer 610 strikes the bottom covered core material 10 from the stack to propel it out of the stack and along the conveyor toward the injector 620. Gravity causes the remaining covered material 10 in the stack to move downward along the partition 605 when the indexer 610 retracts in a reverse direction from the movement of the conveyor 602.

It will be appreciated that in an embodiment of the present invention the covered core material propelled from the stack is covered facedown and the reverse face, facing upward, includes the bottom surface 11 tucked portions. Accordingly, the tucked face is exposed toward the injector 620.

The indexer 610 and injector 620 are in timed synchronization so that the indexer pushes the next covered core material 610 forward as the injector 620 lifts up and down to receive and pin the covered core material in the injector. Metal injector guide 622 preferably holds the covered core material in position for injection. Following injection of the inner reinforcing layer 20, the injection guides 622 retract upward to permit the next indexed covered material into the injector 620.

Referring to FIG. 9, with continuing reference to FIG. 8, the injector includes an injection needle 625 and retracting needle arm 621. As the covered core material 10 is received by injector 620, needle arm 621 and needle 625 are lowered through the core material 10 until injection needle 625 is positioned so that injection hole 628 is positioned between the surface of the core material 10 and the covering material 15. The reinforcing mixture 21, such as cement slurry, is provided by a mixture feed line 630 connected to injection needle 625. The mixture 21 is injected in a desired metered amount, depending on the desired characteristics and thickness of the inner reinforcing layer 20.

Referring again to FIG. 8, in an embodiment of the invention, the injector 620 includes a vacuum base that removes excess water from the mixture 21 (FIG. 9) to form inner reinforcing layer 20 between the covering material 15 and the core material 10. In an additional embodiment, the injected mixture 21 includes a 1:1 cement/water ratio to promote dispersion. The increased water ratio, compared to typical cement mixtures, provides a better dispersion consistency for venting the reinforcing layer 20. The vacuum action acts to dewater the mixture 21 to solidify the injected cement mixture 21.

Once the desired inner reinforcing layer 20 is provided by the injection of mixture 21, the injector, including the injector guide 622, retractable needle arm 621 and needle 625, are lifted upward to permit the injected article 5 to be removed. As disclosed, the next covered core material 10 is indexed forward and the injector, including injector guide 622, needle arm 621 and injector needle 625, lowered to pin the covered core material 10 and repeat the process.

The reinforced article with inner injection layer 20 may be cured as desired.

In one embodiment, the covered core material 10 including the injected inner reinforcing layer 20 is further coated with an outer reinforcing mixture layer 25 (FIG. 1). The application of an outer reinforcing mixture layer 25 is well known in the art, and may include automated or by-hand application of a desirable outer reinforcing layer 25 to the outside of the covering material 15.

Referring to FIG. 10, in another embodiment of present invention, a solid textured layer 50 (FIG. 1) is further applied to the outer reinforcing mixture layer 25. At texturizer station 700 the covered core material 10, including inner and outer mixture layers, is moved along conveyor 701 beneath pad texturizer 705. Sand, or other desired solid texture substance, is disbursed by the rotating pad texturizer 705 to create a desired textured surface on reinforced article 5 (FIG. 1).

Figure 11:
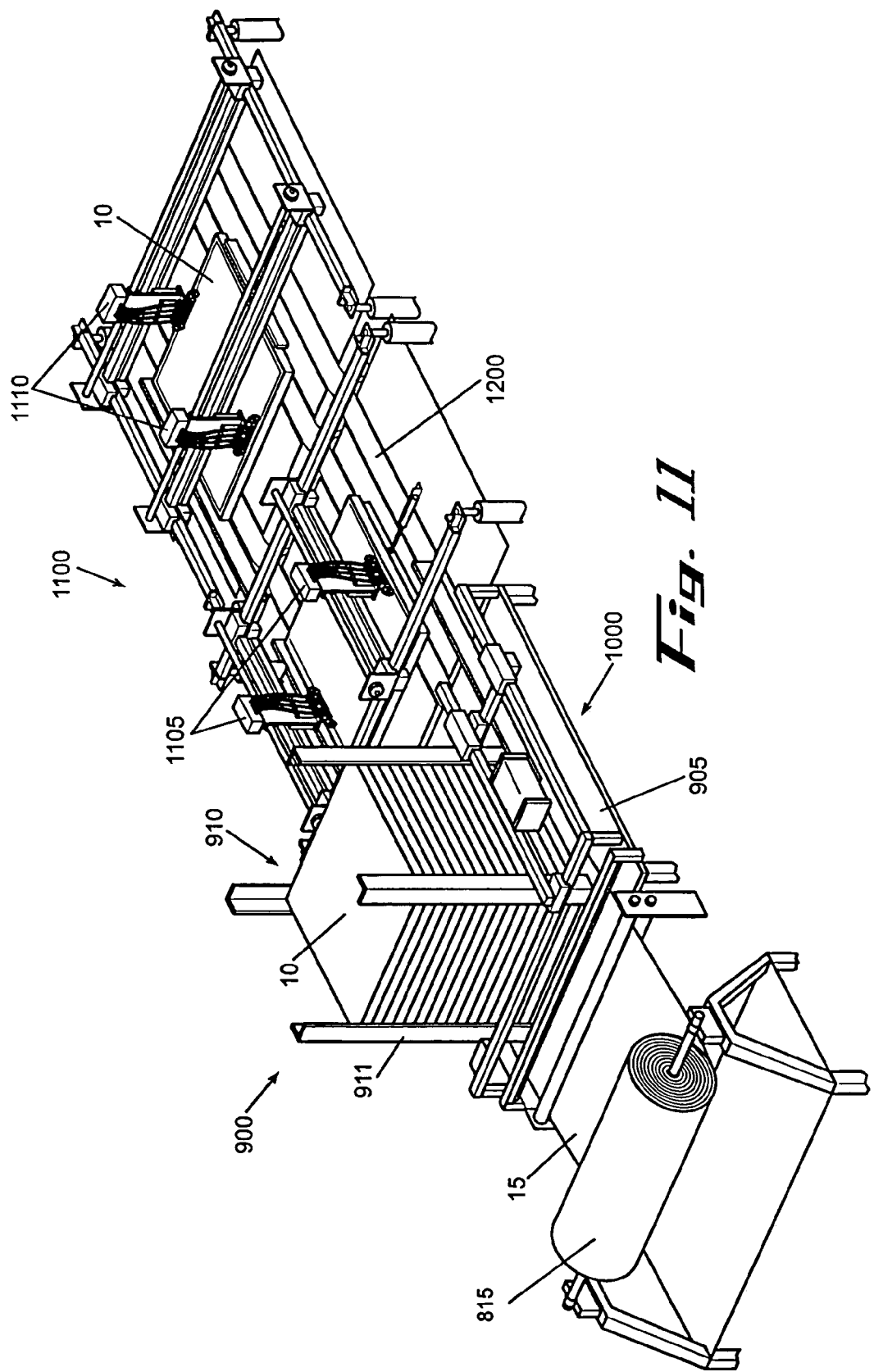
FIG. 11 is a top perspective view of a core material covering, trimming and tucking conveyor apparatus in an embodiment of the present invention.

Referring to FIG. 11, in an alternative embodiment, core material covering, fabric trimming and fabric tucking operations are automated with computer settings and a conveyor system.

In the exemplary embodiment, a fabric dispenser provides fabric 15 from a fabric roll 815 to an automated covering station 900 and automated trimming station 1000. Fabric 15 is provided to the core material 10 at the covering table 905 and the fabric corners are trimmed beneath the table 905.

After the fabric 15 is applied to the core material 10, the covered core material 10 is conducted on a conveyor belt 1200 to the tucking station 1100. The tucking station 1100 includes a pair of horizontal plunging apparatus 1105 and a pair of vertical plunging apparatus 1110 for automatically tucking the fabric 15 into and along each side of the core material 10.

Figure 12:
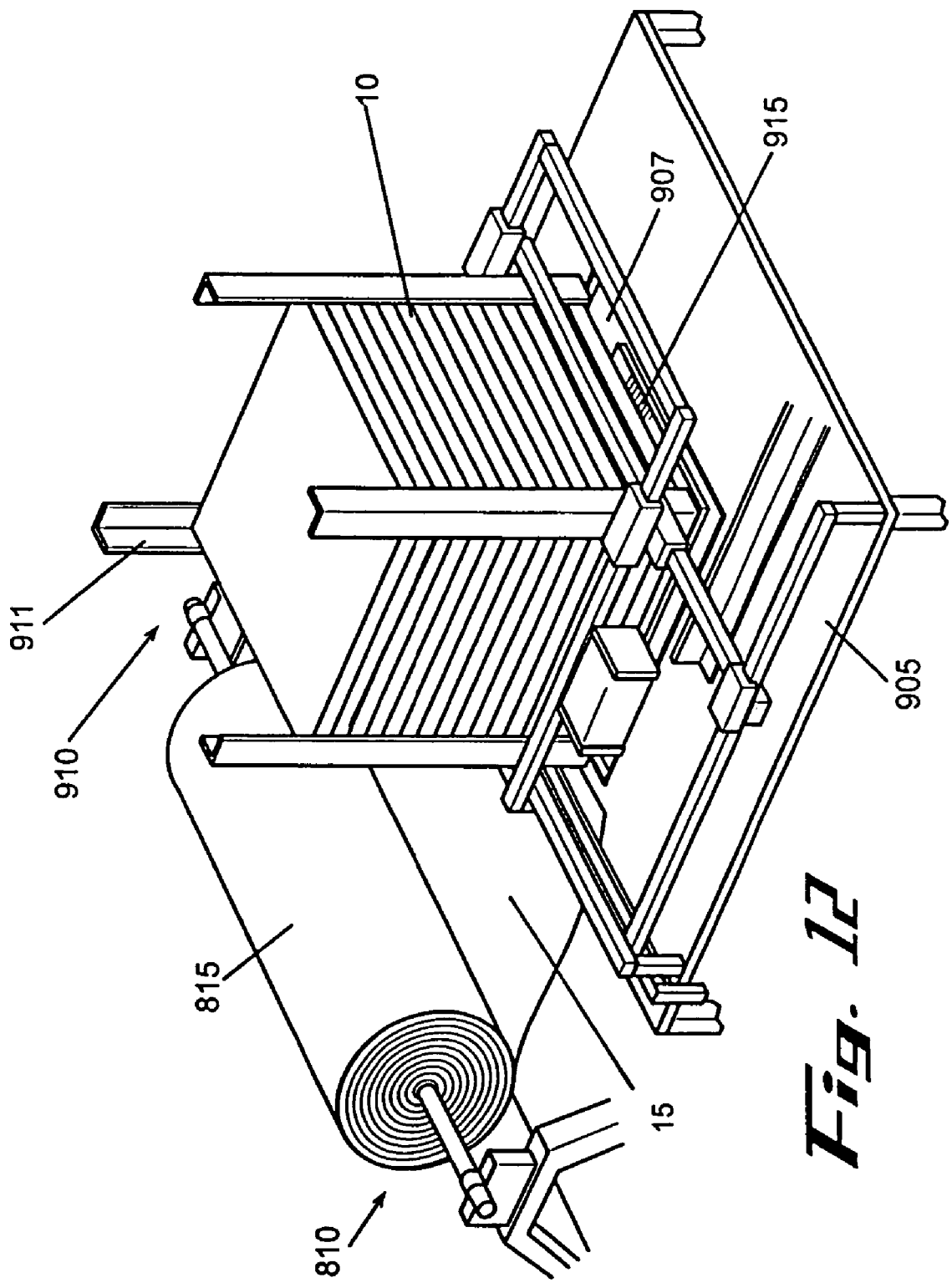
FIG. 12 is a top perspective view of an automated covering station in an embodiment of the present invention.

With reference to FIG. 12, the fabric dispenser 810 includes a fabric roll 815 that dispenses fabric 15 across the automated covering table 905. The fabric dispenser 810 rolls out the desired length of fabric 15 based on computer programmable settings. Such programs settings are well known in the art.

The fabric 15 is dispensed between a raised stack 910 of core material 10 and a trimming station elevator 915. A "hot wire" powered by a moveable cylinder is lowered to burn the fabric 15 so it is cut to the desired length. It will be appreciated that a variety of alternative cutting apparatuses may be used to cut the fabric.

In a fabric 15 receiving position, the elevator 915 is generally level with the covering table 905. The elevator 915 includes a vacuum that secures the fabric 15 across the elevator. As a safety mechanism, a photo eye is provided approximately two inches past the elevator 915 to detect if the fabric 15 does not come within view. In the event that fabric 15 is not detected, the system is stopped for troubleshooting.

Figure 13:
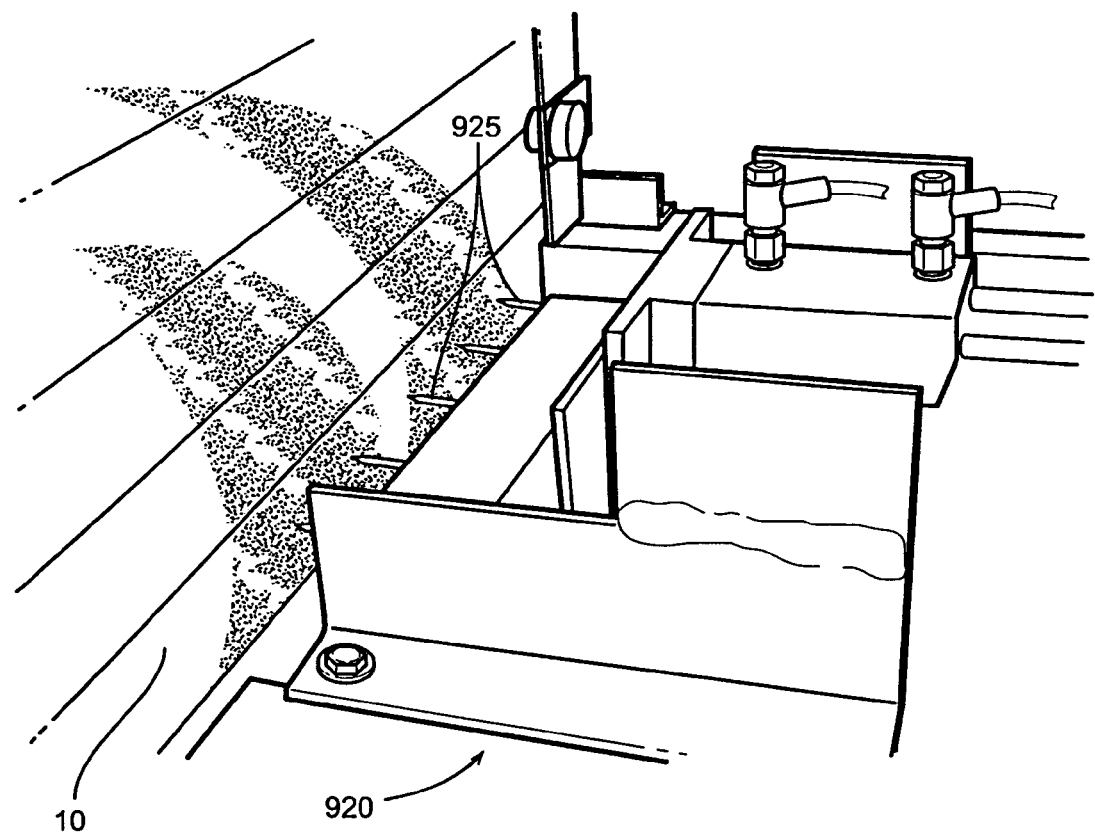
FIG. 13 is a top perspective view of a magazine cylinders apparatus of an automated covering station in an embodiment of the present invention.

With reference to FIG. 13, the elevator 915 and fabric 15 are raised beneath the bottom core material 10 of the raised magazine assembly 911. The magazine dispenser control apparatus 920, such as a moveable cylinder with retractable stabbers 925, releases a core material article 10. It will be appreciated that moveable cylinders include hydraulic cylinders, pneumatic cylinders, electric actuators and the like.

The elevator 915 is lowered with the core material 10 and fabric 15, and the stack 910 adjusts so that the next article 10 in the magazine assembly 911 is engaged by the stabbers 925 until the next cycle. In one embodiment, a photo eye is positioned on the magazine assembly 911 to detect if there are not at least two core materials 10 in the magazine. Because of the ease of loading before the magazine is completely empty, the system will not initiate if there are less than two articles detected. The switch may be bypassed to use all of the articles by covering the photo eye.

Figure 14:
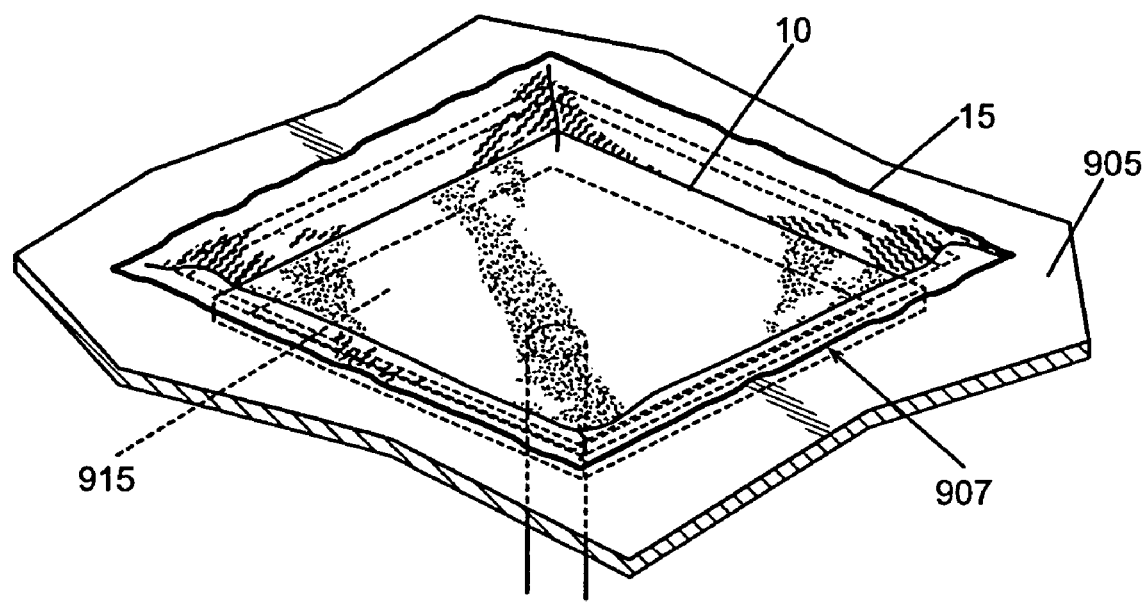
FIG. 14 is a partial perspective view of a core material and fabric lowered beneath a fabric table of an automated covering station in an embodiment of the present of the invention.

As shown in FIG. 14, the elevator 915 is lowered beneath the fabric receiving table 905. As the fabric 15 and core material 10 pass through the elevator slot 907, the edges of the fabric 15 that extend beyond the edges of the core material 10 fold vertically against the sides of the core material 10 and the slot 907.

Figure 15:
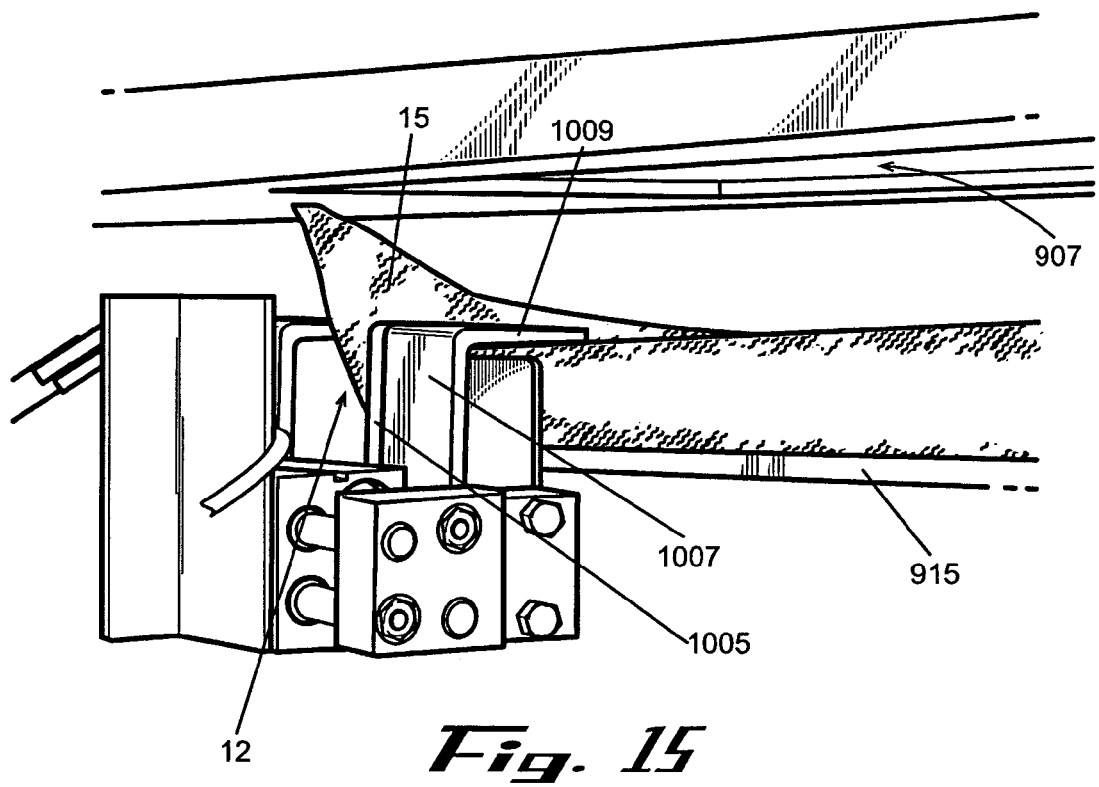
FIG. 15 of the is a partial perspective view of the trimming apparatus of an automated covering station prior to trimming the corner of a covered core material in an embodiment of the present invention.

Referring to FIG. 15, the elevator 915 supporting a rectangular covered core material 10 stops centered between four sets of corner trimming pinchers 1005. Each pincher set 1005 is generally "L" shaped with a horizontal portion 1009 extending over the top of the covered article 10 and a vertical portion 1007 extending along a side of the covered article 10. Each pincher set closes at a respective corner 12 of the covered article 10 so that the vertical portion 1007 of a pincher set 1005 folds the fabric 15 around the sides of the core material 10 and the horizontal portion 1009 folds fabric 15 over a portion of the top of the article 10. The pinchers also hold excess fabric 15 at each corner 12 for trimming.

Figure 16:
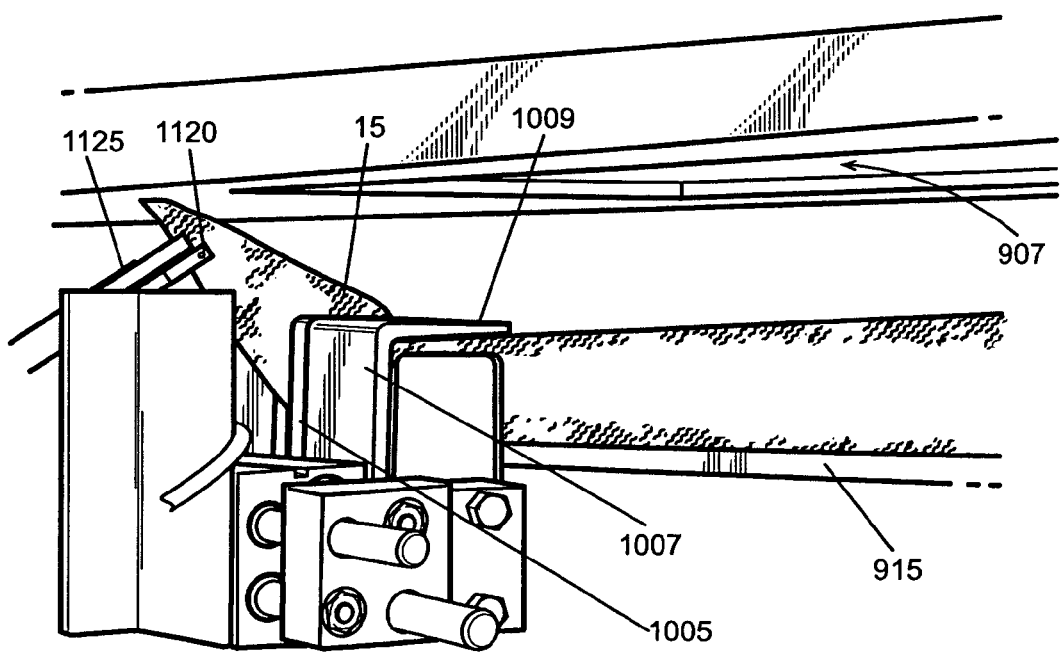
FIG. 16 is a partial perspective view of the trimming apparatus of an automated covering station during trimming of the corner of a covered core material in an embodiment of the present invention.

Referring to FIG. 16, a long cylinder with a small gripper 1120 indexes to each of the four corners 12 and the gripper 1120 grabs and holds the excess fabric 15 at the corner 12. A "hot wire" between the jaws of the pinchers sets 1005 is energized while the fabric 15 is being held by the grippers 1120. The "hot wire" cuts the excess fabric 15 from the corner 12 while simultaneously welding the fabric around the corner 12 of the article 10. The long cylinders for the grippers 1120 retract to pull the cut off fabric away from each of the corners 12.

In an embodiment of the invention, a cooling nozzle 1125 is provided at each corner 12 where the pinchers 1005 conduct trimming operations. Pressurized air is provided to the corner 12 following the weld cut and removal of the excess fabric 15 from the corner 12 to cool and strengthen the weld.

In a further embodiment, a debris removal air nozzle is also provided at each corner 12 of the trimming station to blow away the excess fabric 15 from the grippers 1120. After the grippers 1120 retract with the cut excess corner fabric 15, each gripper 1120 is opened and the debris removal nozzle provides a burst of air to blow away fabric 15 debris from the machine.

The folding pinchers 1005 are subsequently opened to release the article 10 with fabric folded over the bottom face and side surfaces. The elevator 915 is raised up to the height of the covering table 905 until the covered article 10 is beneath the stack 910 of core material 10 in the magazine assembly 911.

A pressurized air nozzle subsequently blows air to propel the article 10 out from underneath the magazine 911 and on to a conveyor 1200 for carrying the article 10 to the tucking station 1100. As a safety precaution, a photo eye is also used to detect if the article 10 does not enter and/or leave the elevator 915 and covering table 905.

The cycle restarts for covering and fabric trimming the next article 10 at the bottom of the stack 910 in the magazine assembly 911.

Figure 17:
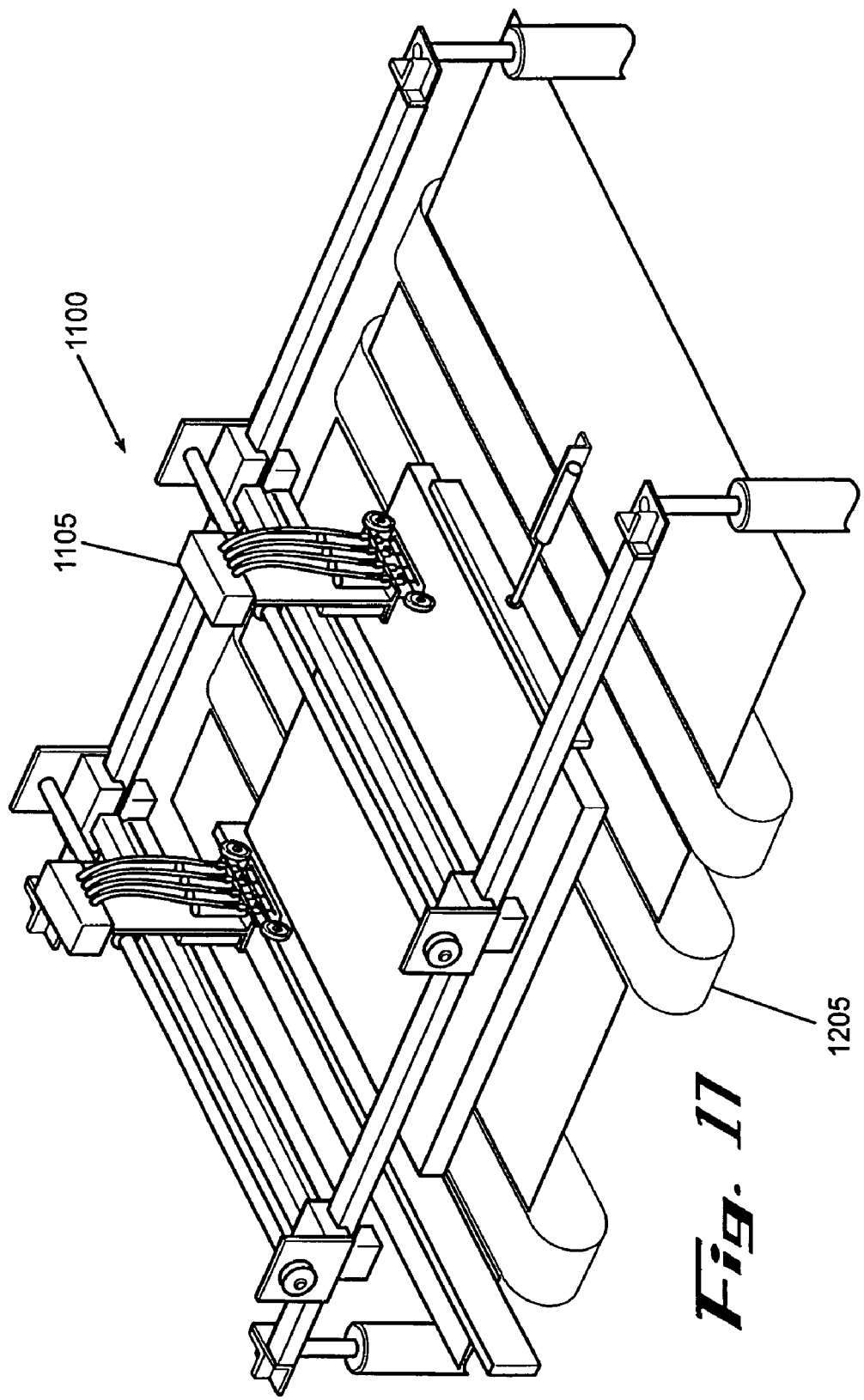
FIG. 17 is a top perspective view of a horizontal tucking apparatus station in a conveyor apparatus with retracted tucking cylinders in an embodiment of the present invention.
Figure 18:
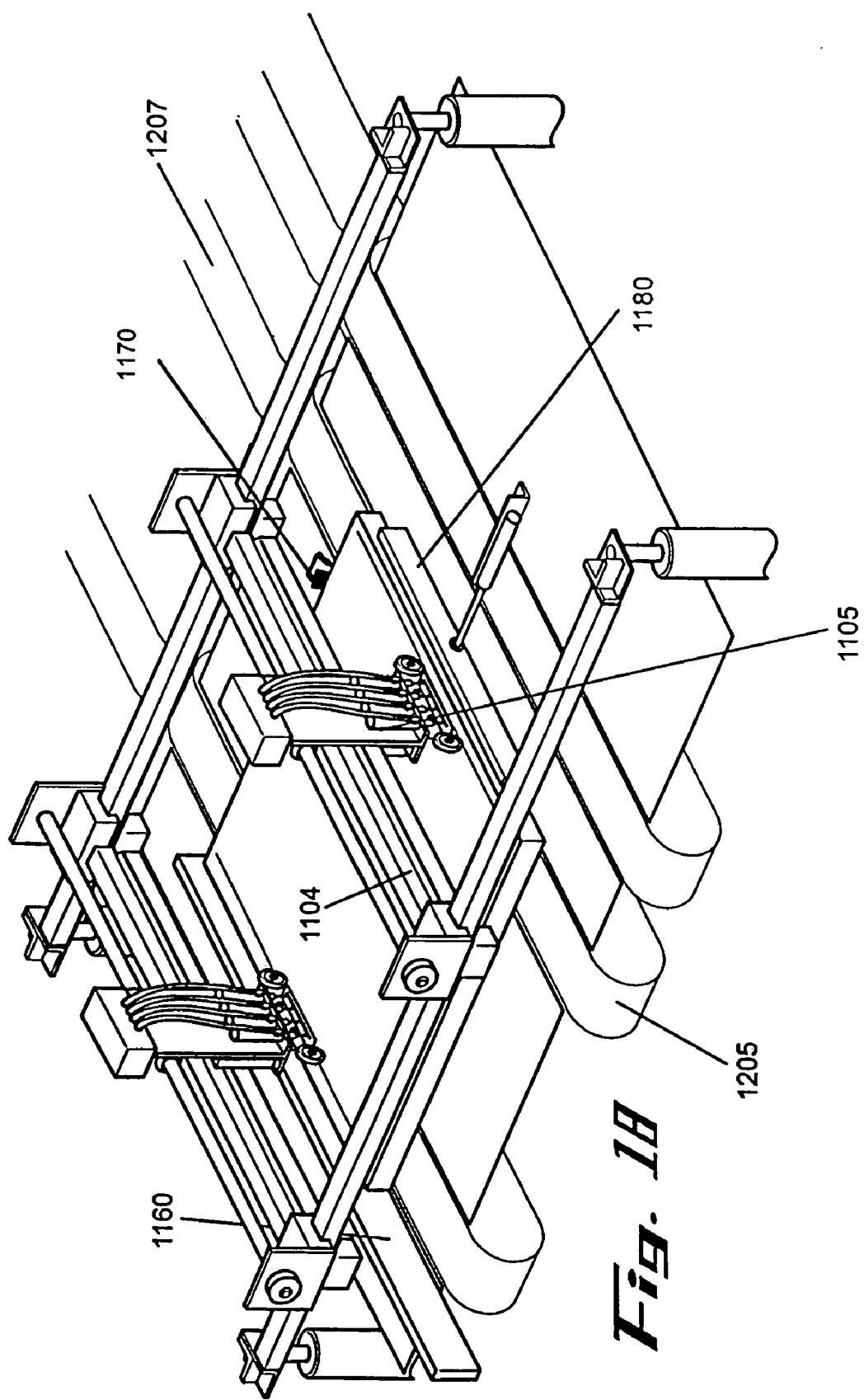
FIG. 18 a the top perspective view of a horizontal tucking apparatus station in a conveyor apparatus with tucking cylinders in lowered operation in an embodiment of the present invention.
Figure 19:
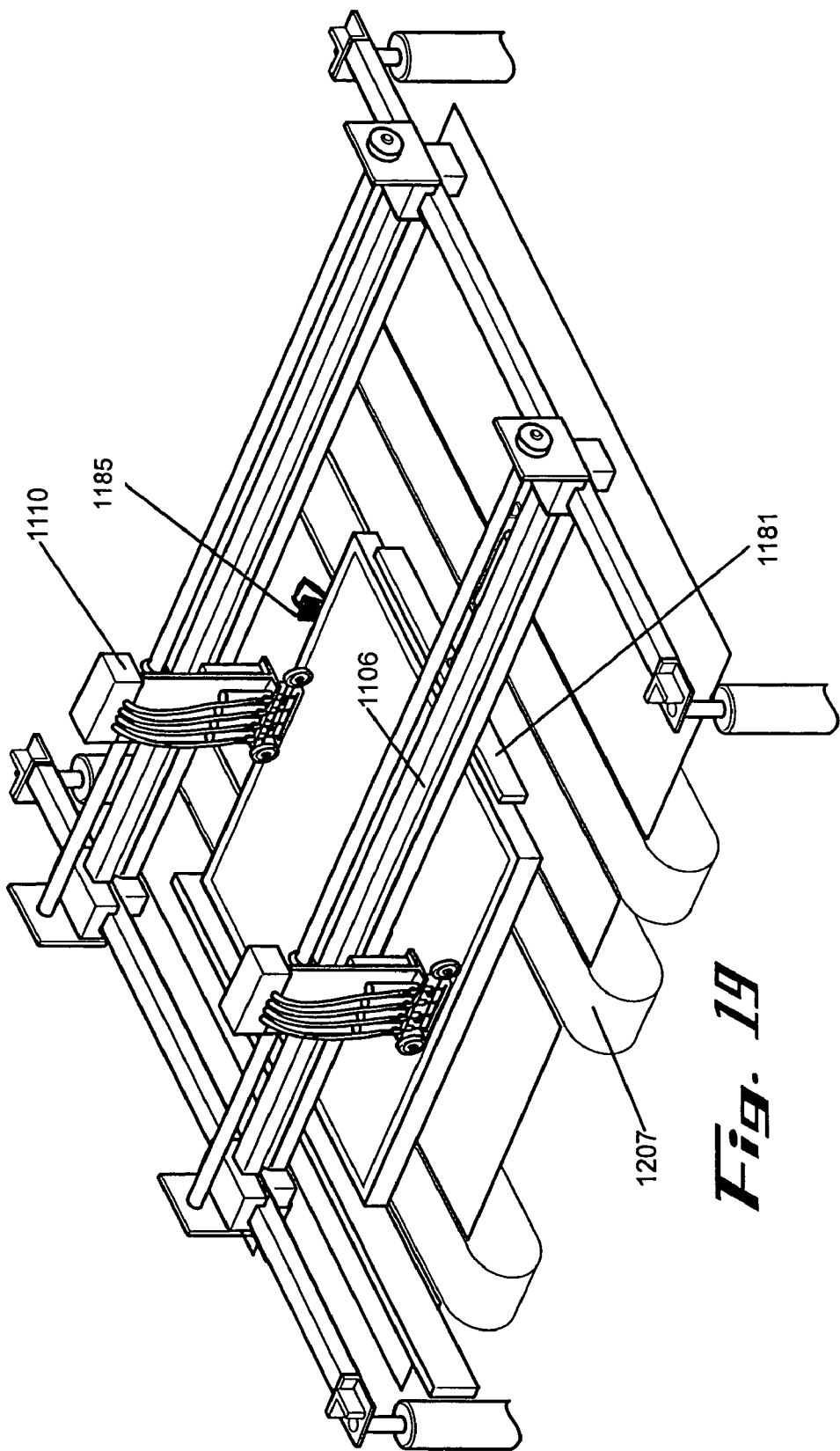
FIG. 19 is a top perspective view of a vertical tucking apparatus station in a conveyor apparatus with retracted tucking cylinders in an embodiment of the present invention.

Referring to FIG. 17, as it is being blown from the covering table, the article 10 is carried on a first conveyor belt 1205 (FIG. 18) to the automated tucking station 1100. With reference to FIGS. 18 and 19, the tucking station 1100 includes a first set of horizontal automated tucking apparatuses 1105 and a second set of vertical automated tucking apparatuses 1110.

Figure 20:
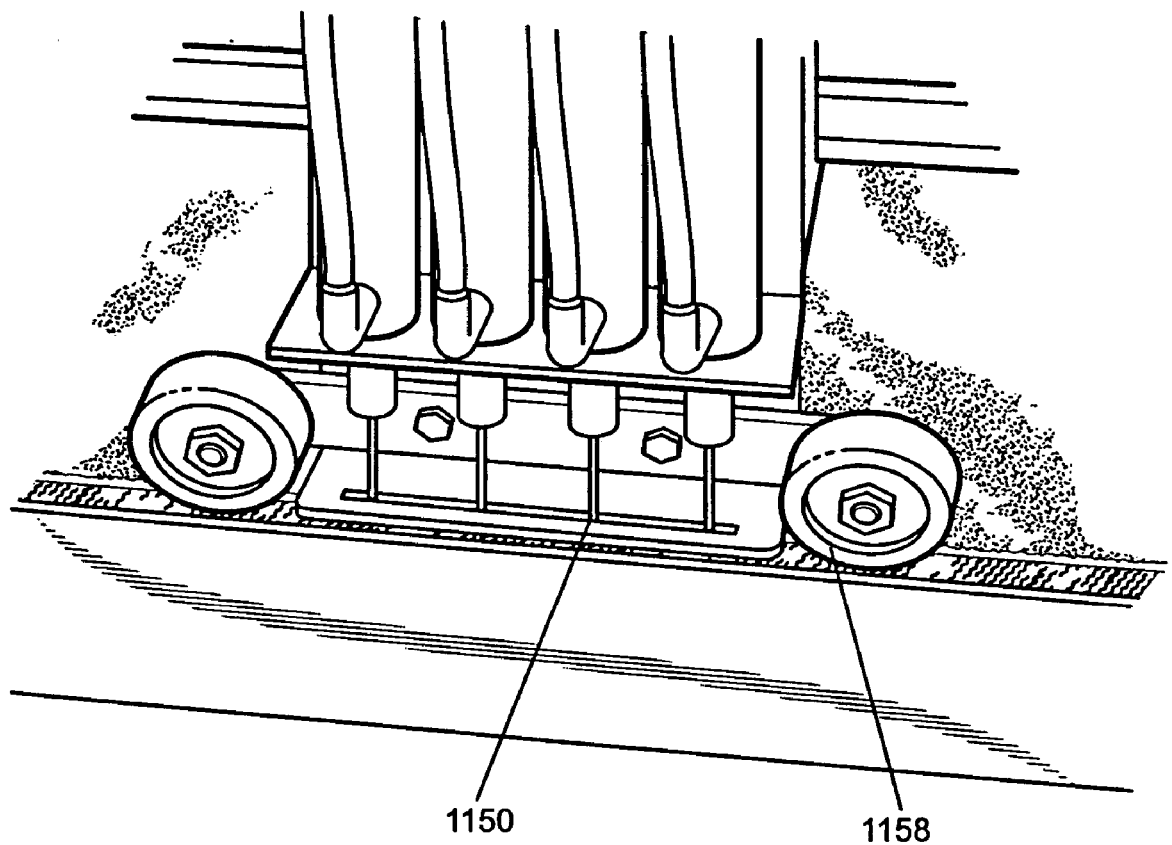
FIG. 20 is a top perspective view of a vertical tucking apparatus station in a conveyor apparatus with tucking cylinders in lowered operation in an embodiment of the present invention.

Referring to FIG. 20, in an embodiment of the invention, a tucking apparatus 1105 and 1110 includes four plungers 1150 and a rolling mechanism 1158. Along an edge of the top surface of the covered article 10, the plurality of plungers 1150 are actuated up and down by a tucking cylinder as the tucking apparatus 1105 and 1110 rolls along the edge in which fabric is being tucked.

With further reference to FIGS. 17-19, along parallel opposite sides of the top fabric covered article 10, each of the horizontal tucking apparatuses 1105 is actuated forward and/or backward to tuck the loose fabric along the top into and along a horizontal edge of the article 10. Similarly, along parallel opposite vertical sides of the covered article 10, the vertical apparatuses 1110 are actuated forward and/or backward to tuck the loose fabric into the article 10.

In the described embodiment, the fabric 15 is first tucked horizontally into opposite edges of the top surface of the article 10. Following the horizontal tucking operation, the article 10 is conveyed to vertical tucking station for the vertical tucking operation. Those of ordinary skill will appreciate that the sequence of horizontal and vertical tucking may be reversed, and that in other embodiments, the tucking operations may be combined, as with programmable timing logic.

Referring to FIG. 18, in one embodiment, the article 10 is blown away from the folding station 900 (FIG. 11) on to the conveyor 1205 to the horizontal tucking station. A first automated stop 1170 or set of stops is pivoted up from the plane of the first conveyor belt 1205 to block and hold the article for horizontal tucking operations. In alternative embodiments, the stop(s) 1170 could be actuated from other positions such that the stop 1170 blocks the path of the article 10 to hold it in place.

After reaching the first stops 1170, a moveable guide rail 1180 is extended to a side of the article 10 to secure it in place. The guide rail 1180 is attached to a cylinder and presses the article 10 against a raised edge 1160 along the conveyor belt 1205 on the opposite side of the article 10 to create a tight fit for consistent tucking of all articles 10. The conveyor 1205 is stopped on actuation of the moveable guide rail 1180.

The horizontal tucking apparatuses 1105 are positioned opposite of one another on the horizontal tucking station frame 1104. The frame 1104 lowers to position the plungers 1150 (FIG. 20) near the article 10 for plunging. The frame 1104 raises to move the tucking apparatuses 1105 away from the article 10, such as accepting and releasing the article 10 for tucking.

After the guide rail 1180 secures the article, the horizontal tucking station frame 1104 is lowered to position the tucking apparatuses 1105 along horizontal tuck lines of the loose fabric 15 on the top surface of the article 10.

With continuing reference to FIG. 20, the rolling mechanisms 1158 of the tucking apparatus contact the article 10 when the frame 1104 is lowered. The tucking apparatus 1105 moves laterally by pneumatic actuation along the frame 1104 as the frame 1104 acts as a track to maintain the tucking apparatus 1105 and plungers 1150 on the tuck line. The plungers 1150 are actuated by cylinders to move rapidly up and down to tuck the fabric 15 into the top surface of the article 10.

Following horizontal tucking, the horizontal stop 1170 is retracted upward and the conveyor 1205 is turned on. In one embodiment a second conveyor belt 1207 is provided to the vertical tucking station. From the first conveyor 1205, and following retraction of the horizontal stops 1170, the covered article with horizontal tucks moves to the vertical tucking station.

Referring to FIG. 19, a vertical station stop 1185 is actuated to stop the article at the desired position on the second conveyor 1207 at the vertical station. Like the horizontal tucking apparatuses 1105, the vertical tucking apparatuses 1110 are positioned on a vertical tucking station frame 1106. However, the set of vertical apparatuses 1110 are positioned perpendicular with respect to the horizontal apparatuses 1005. Accordingly, the remaining loose fabric 15 on the top surface edges of the article 10 is vertically tucked.

Mechanically, the vertical tucking operation is identical to the horizontal tucking apparatus operation.

Following the vertical tucking operation, the vertical station frame 1106 and vertical guide rail 1181 is retracted. The second conveyor belt 1207 is then turned on and the vertical station stops 1185 moved from the path of the covered article 10. The second conveyor 1207 transports the covered article 10 from the vertical tucking station for removal from the system, or, alternatively, carries the article 10 on further conveyor(s) for additional processing, such as the application of reinforcing material.

As a safety precaution and to increase consistency, in one embodiment of the present invention photo eyes are positioned next to each of the horizontal and vertical station stops. The tucking apparatuses will not start unless the pad is detected in the proper position at each station.

In another embodiment, a program switch is also provided that restricts operation of the first conveyor belts from the folding and trimming station to the horizontal tucking station until at least one cycle of the automated tucking and trimming station occurs. In this and alternative embodiments, another program switch is also provided to prevent propulsion of the article following trimming from the elevator area to the horizontal tucking station if the tucking operations are in process. Similarly, the second belts will not be turned on the article transported from horizontal tucking station to the vertical tucking station if an another program switch senses vertical tucking operations are not complete. In such embodiments, any detected problem must be corrected and the system reset for operations to resume.

Accordingly, while the invention has been described with reference to the structures and processes disclosed, it is not confined to the details set forth, but is intended to cover such modifications or changes as may fall within the scope of the following claims.

What is claimed is:

1. A covering process for a core material comprising:
   First, covering at least a portion of a rigid penetrable core material surface with an edge portion of covering material; and
   second, with an automated reciprocating plunging apparatus, creating a tucking groove by perforating the penetrable core material and plunging the edge portion of the covering material to tuck the edge portion of the covering material into the tucking groove of the rigid penetrable core material.

2. The process of claim 1 wherein the covering material is fibrous covering material.

3. The process of claim 2 wherein the core material includes a material selected from the group consisting of polyurethane, expanded polystyrene, plastic, cork and wood.

4. The process of claim 3 wherein the covering material is fabric.

5. The process of 4 wherein the core material includes expanded polystyrene.

6. The process of claim 2 wherein the covering material is fabric.

7. The process of claim 6 wherein the core material is foam.

8. The process of claim 7 wherein the core material includes a material selected from the group consisting of expanded polystyrene, polyurethane, plastic, cork and wood.

9. The process of claim 8 wherein the core material includes expanded polystyrene.

10. The process of claim 1 wherein the core material is foam.

11. The process of claim 10 wherein the covering material is fabric.

12. The process of claim 11 wherein the core material includes a top surface, a bottom surface, and a plurality of side surfaces and further comprising:
    covering the top surface and one or more side surfaces with the covering material; and
    tucking the edge portion of the covering material into the bottom surface of the core material.

13. The process of claim 12 further comprising tucking the entire length of the edge portion of the covering material completely into the core material.

14. The process of claim 13 wherein the core material is expanded polystyrene.

15. The process of claim 1 wherein the core material includes a top surface, a bottom surface, and a plurality of side surfaces and further comprising:
    covering the top surface and one or more side surfaces with the covering material; and
    tucking the edge portion of the covering material into the bottom surface of the core material.

16. The process of claim 1 further comprising tucking the entire length of the edge portion of the covering material completely into the core material.

17. The process of claim 1 wherein the automated plunging apparatus includes:
    a needle for perforating a tuck line in the core material; and
    a plunger for tucking the covering material into the core material along the tuck line.

18. The process of claim 1 further comprising plunging in a perpendicular direction a second edge portion of the covering material into the core material.

* * * * *